(12) United States Patent
Ballet et al.

(10) Patent No.: US 10,996,536 B2
(45) Date of Patent: May 4, 2021

(54) ELECTROCHROMIC DEVICE WITH SELECTIVE MEMBRANE

(71) Applicant: Essilor International, Charenton-le-Pont (FR)

(72) Inventors: Jerome Ballet, Charenton-le-Pont (FR); Samuel Archambeau, Charenton-le-Pont (FR); Jean-Paul Cano, Charenton-le-Pont (FR); David Escaich, Charenton-le-Pont (FR); Claudine Biver, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/014,459

(22) Filed: Jun. 21, 2018

(65) Prior Publication Data

US 2018/0373107 A1    Dec. 27, 2018

(30) Foreign Application Priority Data

Jun. 23, 2017    (EP) .................................. 17305783

(51) Int. Cl.
| | |
|---|---|
| *G02F 1/15* | (2019.01) |
| *G02F 1/03* | (2006.01) |
| *G02F 1/153* | (2006.01) |
| *G09G 3/19* | (2006.01) |
| *G09G 3/38* | (2006.01) |
| *G02F 1/155* | (2006.01) |
| *G02F 1/1503* | (2019.01) |
| *G02F 1/1523* | (2019.01) |
| *G02F 1/161* | (2006.01) |

(Continued)

(52) U.S. Cl.
CPC .......... *G02F 1/155* (2013.01); *G02F 1/1503* (2019.01); *G02F 1/1525* (2013.01); *G02F 1/1533* (2013.01); *C09K 9/02* (2013.01); *G02C 7/02* (2013.01); *G02F 1/15165* (2019.01); *G02F 1/161* (2013.01); *G02F 2001/1536* (2013.01); *G02F 2001/15145* (2019.01)

(58) Field of Classification Search
CPC .......... G02F 1/155; G02F 1/0316; G02F 3/16; G02F 1/163; G02F 1/1523; G02F 1/1525; G02F 1/1521; G02F 1/1533; G02F 1/03; C09K 9/02; B60R 1/088; H04N 9/3137; H04N 9/22
USPC ................ 359/265–275, 277, 245–247, 242; 345/49, 105, 107; 438/929; 349/182–186

See application file for complete search history.

(56) References Cited

U.S. PATENT DOCUMENTS

| | | |
|---|---|---|
| 3,453,038 A | 7/1969 | Kissa et al. |
| 3,652,149 A | 3/1972 | Rogers |

(Continued)

OTHER PUBLICATIONS

European Search Report dated Dec. 14, 2017 in European Application 17305783.7, filed on Jun. 23, 2017.

(Continued)

*Primary Examiner* — Dawayne Pinkney
(74) *Attorney, Agent, or Firm* — Oblon, McClelland, Maier & Neustadt, L.L.P.

(57) ABSTRACT

An electrochromic device including a selective membrane separating two liquid media including at least one electrochromic compound and at least one compound able to be oxidized or reduced and showing low energy consumption.

10 Claims, 1 Drawing Sheet

(51) Int. Cl.
   *G02F 1/1514*   (2019.01)
   *G02F 1/1516*   (2019.01)
   *C09K 9/02*     (2006.01)
   *G02C 7/02*     (2006.01)

(56) References Cited

U.S. PATENT DOCUMENTS

| | | | |
|---|---|---|---|
| 4,039,253 A * | 8/1977 | Jain | G02F 1/0107 |
| | | | 359/267 |
| 2006/0103911 A1 | 5/2006 | Baumann et al. | |
| 2007/0166592 A1 * | 7/2007 | Cho | C08J 5/2231 |
| | | | 429/493 |
| 2016/0282694 A1 | 9/2016 | Biver et al. | |
| 2018/0252975 A1 * | 9/2018 | Endoh | G02F 1/153 |

OTHER PUBLICATIONS

Written Opinion dated Dec. 14, 2017 in European Application 17305783.7, filed on Jun. 23, 2017.

* cited by examiner

ELECTROCHROMIC DEVICE WITH SELECTIVE MEMBRANE

FIELD OF THE INVENTION

The present invention relates to an electrochromic device comprising a selective membrane separating two liquid materials. The selective membrane limits electrochromic compounds diffusion and allow to reduce energy consumption of the electrochromic device in dark state. The invention also relates to an optical article comprising an electrochromic device and a method to prepare such an electrochromic device.

BACKGROUND OF THE INVENTION

Electrochromic devices typically have a structure comprising two transparent outer layers, for example two sheets of organic or mineral glass, two electrically conductive layers, i.e. electrodes, deposited on the inner faces of the outer layers and connected to a power supply, an electrolyte placed between the two electrically conductive layers at the center of said device and an electrochromic compound.

The electrochromic compound is chosen so that it is colored in the reduced state and colorless or weakly colored in the oxidized state, or vice versa.

With such electrochromic devices, it is possible to control state of electrochromic compounds by an electric current, hence its color. Finally, the light transmission of the electrochromic device is controlled with an electric current. Generally, several electrochromic compounds are used in combination.

Efficiency of electrochromic devices is led by a compromise between several performances.

Transparency of the electrochromic device in its clear state, or passive state when no electric current is applied, has to be high.

Transparency in the dark state, or active state when an electric current is applied, is to be defined according to the use of the electrochromic device. In some applications, a very low transmittance is required. For instance, sunglasses of class 4 have a transmission lower than 4%.

The range of transmission between the clear state and the dark state is a second measure of the performance of the electrochromic device.

Then, energy is required to switch from clear to dark state, and sometimes to maintain the dark state. For mobile devices, in which energy storage systems are required, lowering energy consumption is key to obtain light and compact devices. Energy efficiency is a third measure of the performance of the electrochromic device.

Last, the time required to fade from clear state to dark state is important. If some applications like windows can fade slowly, i.e. within minutes, a much quicker fading time is required for head worn devices, like helmets for motorcyclists. In addition, for safety reasons, the electrochromic device should be in the clear state if no more energy is available. Fading rate is a fourth measure of the performance of the electrochromic device.

Electrochromic compounds may be of different types.

Solid layers are often deposited directly in contact with electrodes. Such systems usually do not require much energy because electrochromic compounds remain in their colored or clear state in the absence of electric current. However, solid layers are not able to provide dense color and very low transmission in dark state, unless they are thick. And thick layers react usually slowly. In addition, solid layers may induce light scattering and haze.

When low transmission in dark state and quick fading time are required, electrochromic compounds are used in liquid media.

In this case, the concentration of electrochromic compound yielding dense color in the dark state can be reached quickly. In addition, colored compounds are able to diffuse in the liquid medium and may combine with another compound to switch to colourless state. This relaxation phenomenon has two consequences.

When electric current is shut, in passive state, electrochromic compounds will automatically reach their colourless state and the electrochromic device will be in clear state. Depending on the concentration of compounds, characteristics of liquid medium and geometry of device, fading rate can be very quick.

As electrochromic compounds are continuously recombining, maintaining a constant colored state requires forming colored compounds continuously by application of electric current. Energy consumption is therefore higher in liquid based systems.

It is then desirable to improve electrochromic devices based on liquid media to lower energy consumption while keeping high transmission in clear state, large range of transmission between clear and dark state and quick fading.

The objective of the present invention has been to control recombination of electrochromic compounds in a device based on liquid media, so as to keep an acceptable balance between energy consumption and switching times from clear to dark state, and vice versa. The electrochromic device developed by the applicant relies on a membrane through which electrochromic compounds cannot diffuse easily but which has almost no effect on diffusion of small charged compounds like counter ions.

U.S. Pat. No. 6,178,034 discloses an electrochromic device comprising a selective ion transport layer. This membrane may be inorganic or organic and separates a solid layer of electrochromic material (inorganic or polymers) on one side and an electrolyte layer on the other side. This electrolyte may be solid or liquid and contains compound able to be oxidized or reduced. When electric current is imposed, electrochromic material and compound undergo oxidation or reduction and are separated by selective ion transport layer. This allows to keep the colored state with very low energy consumption, and even to recover energy when recombination occurs. These systems are however not very transparent in clear state (around 77%) and the leakage current through the latter determines the time required for fading when no energy is applied (open circuit), typically several hours.

OBJECT OF THE INVENTION

An object of the invention is an electrochromic device comprising two electrodes defining a chamber, a selective membrane separating the chamber in two compartments, two liquid materials filling the compartments and at least one electrochromic compound and at least one compound able to be oxidized or reduced dispersed in said liquid materials.

The invention relates also to an optical article, in particular an ophthalmic article comprising said electrochromic device.

Another object of the invention is a method of preparation of said electrochromic device.

DESCRIPTION OF THE INVENTION

Figure 1:
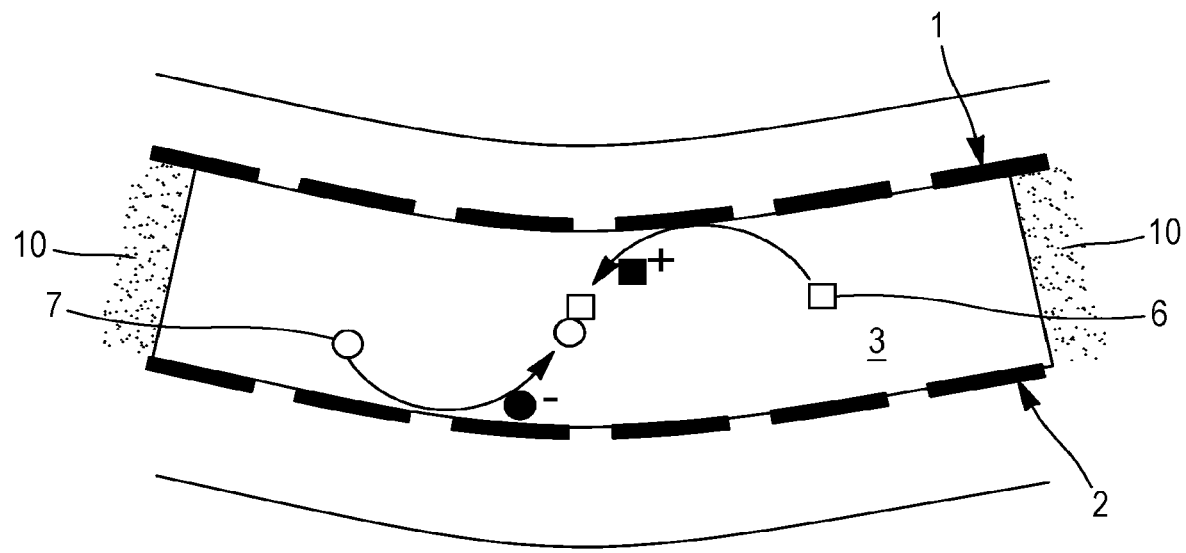
FIG. 1 shows the structure of an electrochromic device according to prior art. Two electrodes (1) and (2) are laid on two substrates and define a chamber (3), limited by a seal (10). Colourless electrochromic compounds (6, 7) are dispersed in each compartment. When electric current is applied, compound (6) is oxidized in compound (6+) at electrode (1) and compound (7) is reduced in compound (7−) at electrode (2), yielding a specific colour defined by compounds (6+) and (7−). If compounds (6+) and (7−) meet, they recombine in colourless compounds (6) and (7). A stable colour in time requires a continuous current to balance creation and recombination of compounds (6+) and (7−).

Electrochromism is a well known physical phenomenon which is observed with certain classes of chemical compounds that reversibly change colour when a voltage is applied to them. The material undergoes reversible changes in optical properties by oxidation and reduction. Advantageously, the electrochromic material is colourless when no electric field is applied and becomes coloured when an electric field is applied.

An electrochromic device, i.e. a device containing electrochromic compounds, can have two states, i.e. a coloured state (when electrically activated) and a clear state (generally in the passive state). The optical transmission properties of the device depend on the nature, concentration and light absorbance of the electrochromic compounds.

Often, electrochromic devices comprise additional compounds which are not electrochromic. Said compounds may be oxidized or reduced, like electrochromic compounds, but don't show any optical property changes. In the following, these compounds are referred to as colourless electro-compounds.

Electrochromic devices require at least two compounds. Both may be electrochromic or only one compound is electrochromic, the other being a colourless electro-compound The electrochromic device of the invention comprises:
  two electrodes (1, 2) defining a chamber (3),
  a selective membrane (5) separating the chamber in two compartments (4a, 4b),
  two liquid materials filling the compartments,
  at least one electrochromic compound and at least one compound able to be oxidized or reduced dispersed in said liquid materials.

Electrodes may be deposited on any substrate used for optical applications, in particular transparent materials. Mineral glass and organic material are suitable substrates. Organic material may be selected from the list of polymethylmethacrylate (PMMA), cellulose triacetate (TAC), polyesters, in particular polyethyleneterephthalate (PET), polycarbonates (PC).

Electrodes may be designed with an organic or mineral conductive material. Organic mineral materials include coatings comprising carbon nanotubes, graphene or conductive polymer like PEDOT. Mineral conductive materials are very often mineral oxides, known as transparent conductive oxide (TCO), such as Indium Tin Oxide (ITO). Other suitable mineral conductive materials are noble metals or multilayered coatings having a TCO/metal/TCO structure, in which TCO protects metal from oxidation, such as Gallium Zinc Oxide (GZO), Aluminium Zinc oxide (AZO) or Fluorine Tin oxide (FTO). Electrode material is selected to have easy deposition on substrate with a durable adhesion, high conductivity and high transparency. Preferred conductive material is ITO.

The selective membrane (5) is an organic material which allows for selective diffusion of electrochromic compound depending on a specific property but is also an ionic conductor, allowing for diffusion of some charged particles. By this way, the electric current can flow through the membrane without noticeable resistance.

For instance, the membrane may be porous and the size of pores allows for diffusion of small molecules, whereas large molecules are blocked. Membranes used in ultrafiltration processes are suitable.

In another embodiment, the membrane may have solubility properties such that some electrochromic compounds are soluble in the membrane and may diffuse through it, whereas other electrochromic compounds are not soluble in the membrane and blocked.

In another embodiment, the membrane may have solubility properties such that some charged compounds (counter ions, salts) are soluble in the membrane and may diffuse through it, whereas electrochromic compounds are not soluble in the membrane and blocked.

In another embodiment, the membrane may contain ionic polymers or ionic liquids. In such case, charged electrochromic compounds will not be able to diffuse through the membrane because of electrostatic interactions, whereas neutral electrochromic compounds will diffuse freely.

In all cases, the membrane has a selective effect on electrochromic compounds diffusion. In particular, the membrane may be porous for colourless electro-compound and a barrier for an electrochromic compound.

The thickness of the membrane is selected according to its selective properties, transparency and ease of use. Membranes with a thickness lower than 300 μm provide with acceptable transparency of the device and low reduction of electric conduction. Membranes with a thickness lower than 100 μm show the additional advantage of limiting the overall thickness of the electrochromic device.

Preferred membranes are based on organic polymer like polymethylmethacrylate (PMMA), polyvinylalcohol (PVA) or polyurethane (PU), in particular based on polyvinylalcohol.

Polyvinylalcohol with molecular weight in the range of 1000 to 1000000 are particularly suitable. In some embodiment, a mixture of polyvinylalcohols having different molecular weights and/or hydrolysis degree is used. Suitable mixtures comprise at least one polyvinylalcohol with molecular weight in the range of 1000 to 100000 and at least one polyvinylalcohol with molecular weight in the range of 100000 to 1000000. It is believed that such a mixture tunes very finely solubility of electrochromic compounds in the membrane as well as the mechanical properties of the membrane.

The selective membrane (5) defines two compartments (4a, 4b) in the chamber of the electrochromic device. These compartments are filled with liquid materials comprising at least one electrochromic compound and one compound able to be oxidized or reduced, such as an electrochromic compound or a colourless electro-compound.

Liquid material may be any solvent having suitable properties to disperse electrochromic compound and withstand electrochemical environment. In particular, this solvent needs to be inert under electric current. When an electrochromic compound is dispersed in the liquid material, it means that the electrochromic compound is either dispersed (in form of finely divided particles) or solubilised in the liquid material.

The liquid material may contain additives to increase its viscosity or to form gels. Gels are a specific embodiment of liquid material. It's worth noting that diffusion in a gel is not hindered at all. Gels have similar diffusion properties as non gelled liquid materials but have the advantage of being easier to handle during electrochromic device manufacturing. In particular, a gel material may be a support for the membrane layer.

Suitable liquid materials are ionic liquids, propylene carbonate, cyanoethylsucrose, gamma butyrolactone or dimethylsulfoxide (DMSO), in particular polymethylmethacrylate (PMMA) gels, more precisely PMMA gels in propylene carbonate. Liquid materials with boiling point higher than 150° C. are particularly suitable.

In addition, liquid material generally comprises electrolytes, to control and adjust electric conductivity. These electrolytes generally diffuse freely through the selective membrane.

The liquid material with all electrochromic compounds, colourless electro-compounds, electrolytes, additives forms an electrochromic composition.

Electrochromic compounds may be selected according to the properties requested for the electrochromic composition in particular colour, but also to electrochromic properties such as high absorption in the coloured state, low absorption of visible radiations in the bleached state, fast colouring and fading rates and long-term stability, in particular to oxygen or ageing performance.

The colour of the electrochromic composition may be neutral (i.e. brown, grey, grey-green . . . ). Such neutral colour can be preferentially chosen with respect of the ISO Standard 1836, which defines the relative visual attenuation coefficient of filters of categories 0, 1, 2 and 3. Other examples of tints defining a neutral colour are given in documents U.S. Pat. Nos. 6,255,238 and 5,438,024.

Electrochromic composition having the desired colour can be obtained by mixing different electrochromic compounds. These different electrochromic compounds can be electrochromic oxidizing compounds as well as electrochromic reducing compounds. However, obtaining the desired colour for an electrochromic composition is an exercise much more complex than simply mixing colours. Indeed, in addition to the numerous requirements that the electrochromic compounds should meet, the challenge of using a combination of different electrochromic compounds lays in the compatibility of said electrochromic compounds with each other. For instance, the absorption coefficient of commonly used electrochromic reducing compounds is generally far lower than electrochromic oxidizing compounds such as viologen compounds. On the other hand, the use of a combination of several electrochromic oxidizing compounds in a single composition further requires that the electrochromic oxidizing compounds have oxydo-reducing potentials close enough so that they can change colour simultaneously when a potential is applied to the composition.

In a particular embodiment, at least one of the electrochromic compounds used in the invention is a viologen derivatives. Viologen derivatives can show a wide variety of colours in their coloured states, including red, blue and green, which enables obtaining the desired colour, and in particular neutral colours, for the electrochromic composition to be used in the invention. In particular, the colour of the electrochromic composition can be adapted to the desired colour without the need of a specifically coloured electrochromic reducing compound. In other words, the suitable reducing compound can be chosen regardless of the coloured state or visible light absorbing state that such a reducing compound may have: it can be a colourless electro-compound.

The electrochromic device according to the invention is intended to show a large range of transmission between the clear and the dark state.

In the clear state, the electrochromic device according to the invention should not be perceived by the user of the device. In other words, the difference of light perception for the user with and without the electrochromic device should be small. In particular, in clear state, transmission factor in the visible range, also defined as light transmittance, is higher than 80%, more preferably higher than 85%, even more preferably higher than 90%. Transmission factor in the visible range may be 86%, 87%, 88%, 89%, 90%, 91%, 92%, 93%, 94%, 95%. If transmission factor is higher than 85%, electrochromic device according to the invention is particularly suitable for ophthalmic lenses, in which a high transmission factor means that lenses may be worn all day long, including indoor or in low light conditions.

In a particular embodiment, the clear state is the passive state, in which no electric current is applied (electrodes are short circuited). In case of electric trouble or energy shortage, the electrochromic device will stay in a clear state, which is preferable for safety reasons.

In the dark state, the electrochromic device according to the invention should attenuate strongly light transmittance, so as to avoid glare for the user of the device. In particular, transmittance in the dark state may be smaller than or equal to 43%, preferably smaller than or equal to 18%, more preferably smaller than or equal to 8%.

According to the invention, the electrochromic device comprises two compartments filled with two liquid materials. The liquid materials may be identical (both compartments are filled from the same stock solution) or different. Electrochromic compounds may be dispersed in both compartments or in only one compartment.

Generally, selective membrane is not totally impermeable to electrochromic compounds and electrochromic compounds are able to diffuse from one compartment to the other through the membrane, in a time scale much longer than what would occur without the membrane. Then, composition of both compartments will finally be the same.

If selective membrane is totally impermeable to an electrochromic compound, it is possible to have two liquid media comprising different electrochromic compounds. In particular, one compartment may comprise an electrochromic oxidizing compound while the other compartment comprises an electrochromic reducing compound. Further, a colourless electro-compound is present in both compartments, and can diffuse through selective membrane. In this configuration, depending on the sign of the tension applied between electrodes, the electrochromic oxidizing compound or the electrochromic reducing compound is activated. Finally, a single electrochromic device may present three states: a clear state, a first dark state with a first colour defined by the electrochromic oxidizing compound and a second dark state with a second colour defined by the electrochromic reducing compound.

A second object of the invention is an optical article comprising an electrochromic device as described above, such as ophthalmic elements and devices, display elements and devices, windows or mirrors. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. Non-limiting examples of display elements and devices include screens and monitors. Non-limiting examples of windows include automotive and aircraft transparencies, filters, shutters, and optical switches.

As the electrochromic device according to the invention lowers energy consumption, it is particularly suitable for mobile devices in which batteries or power supply shall be as light and compact as possible. In particular, the optical article of the present invention is an optical lens, and preferably an ophthalmic lens.

This ophthalmic lens may be inserted in spectacle frames or in a head mounted device. Non limiting examples of head mounted devices include immersive and non-immersive devices, in particular see-through devices and see-around devices. Head mounted devices may be either augmented reality devices or virtual reality devices.

A third object of the invention is a method of preparation of the electrochromic device described above, comprising the following steps:

- providing a first substrate coated with a first electrode on at least a part of one face of the first substrate,
- laying a first liquid material on said first electrode,
- laying a selective membrane on said first liquid material, forming a first compartment between said first electrode and said selective membrane,
- providing a second substrate coated with a second electrode on at least a part of one face of the second substrate, so as to define a second compartment limited by the selective membrane and the said second electrode,
- filling said second compartment with a second liquid material and
- wherein at least one electrochromic compound and at least one compound able to be oxidized or reduced are dispersed in said liquid materials.

Electrochromic compounds may be introduced in the liquid materials prior deposition. It is also possible to lay one liquid material without electrochromic compound and the other liquid material with electrochromic compound and heating the whole electrochromic device at moderate temperature, below 70° C., ideally 50° C. for some time, less than 10 hours, ideally 2 hours, so that electrochromic compound diffuses through the selective membrane and both liquid material become filled with electrochromic compound. This last method is suitable only for selective membranes which are not totally impermeable to electrochromic compound.

EXAMPLES

The following examples are included to demonstrate various embodiments of the invention. Many changes can be made in the specific embodiments which are disclosed and still obtain a similar result. Such equivalents are intended to be encompassed by the claims.

Figure 2:
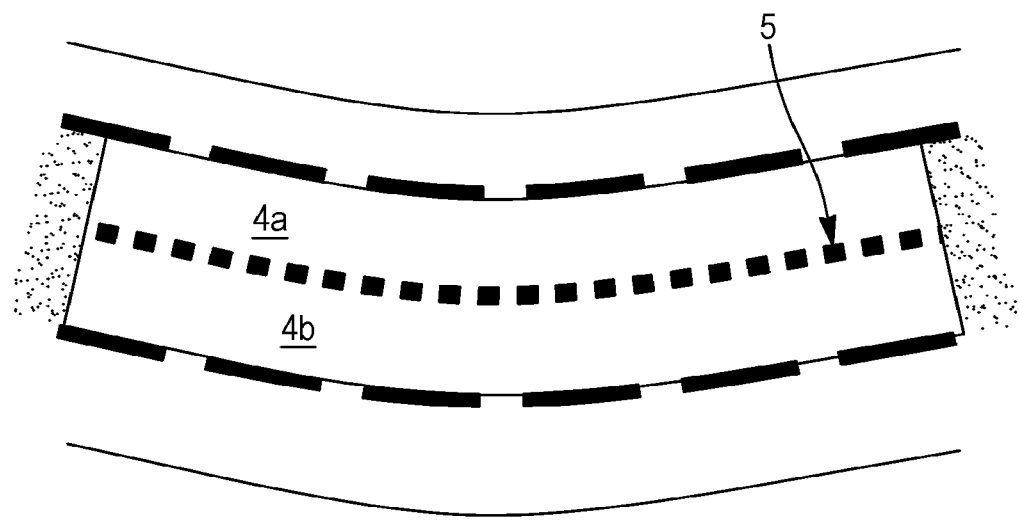
FIG. 2 shows the structure of electrochromic device according to invention. The chamber is separated in two compartments (4a) and (4b) by a selective membrane (5). In this case, recombination of compounds (6+) and (7−) is strongly limited and a lower current is required to keep a stable colour in time.

1—Preparation of an Electrochromic Device E1, as Shown on FIG. 2.

A first mineral glass lens is provided, with an electrode (1) of Indium Tin Oxide on its concave side, and laid horizontally.

Then, a mixture of 40 g of polymethylmethacrylate (Molecular weight 100000) and 60 g propylene carbonate is diluted in butyl acetate to form solution A.

Solution A is coated on mineral glass lens by spin coating and heated at 50° C. until butyl acetate is evaporated, yielding a hard layer of thickness 5 µm. This hard layer is compartment (4a).

Then, 10 g of polyvinylalcohol (Molecular Weight 200000, hydrolysis ratio 88%), 25 g of isopropanol, 2.5 g of EMI-TFS (ethylmethylimidazolium trifluoromethane sulfonate), 5 g of $LiClO_4$ (lithium perchlorate) and 0.2 g of CoatOSil™ 77 surfactant (supplier Momentive) were added to 200 g water to form solution B.

Solution B is spin coated on compartment (4a) then heated in an oven at 80° C. for 10 minutes, yielding a selective membrane (5) of thickness 4 µm.

At the periphery of electrode (1), a thin section of the selective membrane (5) is removed and a seal is deposited. The seal contains spacers, so as to have a seal thickness of 110 µm.

Then, a second mineral glass lens is provided, with an electrode (2) of Indium Tin Oxide on its convex side, and laid on the seal. A void remains between electrode (2) and membrane (5), defining compartment (4b).

The assembly is then heated at 120° C. to cure the seal.

A solution C1 of 10% of Polymethylmethacrylate (molecular weight 100000), 0.05 mol/L ethyl viologen (electrochromic compound), 0.05 mol/L methylphenothiazine (colourless electro-compound) in propylene carbonate is prepared and introduced in compartment (4b) through a hole in the seal (said hole being later closed with a heat curable glue).

Finally, electrochromic device is heated for 2 hours at 50° C., so that electrochemical compounds and electrolyte diffuse through membrane (5) in both compartments (4a) and (4b).

2—Characterization

The following measurements where done on prepared electrochromic device:

- Luminous transmittance T % in clear state (passive state) and dark state was measured with Haze-Guard Plus© haze meter from BYK-Gardner (luminous transmittance is defined in the standard ISO 13666:1998 and is measured according to the standard ISO 8980-3), defining a range of transmittance ΔT for the device.
- Activation time: Time required to switch from clear state to a state where transmittance is lowered by 90% of ΔT.
- Fading time: Time required to switch from dark state to a state where transmittance is increased by 90% of ΔT, with electrodes short circuited.
- Stationnary current: Electric current required to maintain electrochromic device in the dark state ($mA/cm^2$)

3—Examples

Electrochromic device E1 with a selective membrane is compared to similar electrochromic device without selective membrane.

Electrochromic device Ea is prepared similarly to electrochromic device E1 (same composition for solution A and C1 but selective membrane is not deposited.

Electrochromic device Eb is prepared similarly to electrochromic device Ea, but propylene carbonate in solution A and C1 is replaced by a 50%/50% (in weight) mixture of propylene carbonate and cyano ethyl sucrose.

Electrochromic device Ec is the preferred embodiment of U.S. Pat. No. 6,178,034 (Ex13, with overcoat, transient times are defined with 20% transmittance reference instead of 90% of ΔT)

TABLE 1 shows characterization of all electrochromic devices:

| Example | T % in clear state | T % in dark state | Activation time (s) | Fading time (s) | Stationnary current ($\mu A/cm^2$) |
|---|---|---|---|---|---|
| E1 | 85 | 8 | 30 | 17 | 15 |
| Ea | 85 | 10 | 15 | 15 | 150 |
| Eb | 85 | 8 | 62 | 173 | 45 |
| Ec | 76.7 | 4.4 | 13* | >1800 (open circuit) 60 (bleach) | 0.33 |

Examples according to the invention show a good compromise between all performances required: low energy consumption while keeping high transmission in clear state, large range of transmission between clear and dark state and quick fading.

Comparative example Ea shows quicker activation and fading times, but with a much higher stationary current required in dark state, limiting strongly autonomy of device Ea, or requiring heavier batteries as for device E1.

Comparative example Eb uses cyano ethyl sucrose so as to increase viscosity in the compartment. As viscosity is increased, recombination rate of electrochromic compounds is lowered, but transient times are much longer. Besides, stationary current is lowered as compared to electrochromic device Ea, but not as much as electrochromic devices according to the invention, with a selective membrane.

Last, comparative example Ec which uses a selective ion transport layer and solid state electrochromic layers shows a dramatically low stationary current, but very long transient times and low transmittance in clear state, which are not acceptable in many applications, especially in ophthalmic devices.

The invention claimed is:

1. An electrochromic device comprising:
   two electrodes defining a chamber;
   a selective membrane separating the chamber in two compartments;
   liquid material filling the two compartments;
   at least one electrochromic compound dispersed or solubilized in said liquid material and at least one colorless compound able to be oxidized or reduced dispersed or solubilized in said liquid material; wherein
   the liquid material of the two compartments may be the same or different, and
   a light transmittance of the electrochromic device is greater than 80% in a clear state.

2. The electrochromic device according to claim 1, wherein the selective membrane has a thickness lower than 300 μm.

3. The electrochromic device according to claim 1, wherein the membrane is a polyvinylalcohol membrane.

4. The electrochromic device according to claim 1, wherein liquid materials are gels.

5. The electrochromic device according to claim 1, wherein liquid materials are PMMA based gels.

6. The electrochromic device according to claim 1 having a light transmittance larger than 85% in clear state.

7. An optical article comprising an electrochromic device according to claim 1.

8. The optical article of claim 7, said article being an optical lens.

9. The optical article of claim 7, said article being an ophthalmic lens.

10. A method of preparation of an electrochromic device according to claim 1, comprising:
   providing a first substrate coated with a first electrode on at least a part of one face of the first substrate,
   laying a first liquid material on said first electrode,
   laying a selective membrane on said first liquid material, forming a first compartment between said first electrode and said selective membrane,
   providing a second substrate coated with a second electrode on at least a part of one face of the second substrate, so as to define a second compartment limited by the selective membrane and the said second electrode,
   filling said second compartment with a second liquid material and
   wherein at least one electrochromic compound and at least one compound able to be oxidized or reduced are dispersed in said liquid materials, and
   wherein electrochromic device has a light transmittance larger than 80% in clear state.

* * * * *